April 23, 1935.  F. T. RADLEY ET AL  1,998,637
FLOWERPOT AND BLANK FOR MAKING SAME
Filed Oct. 9, 1933   2 Sheets-Sheet 1
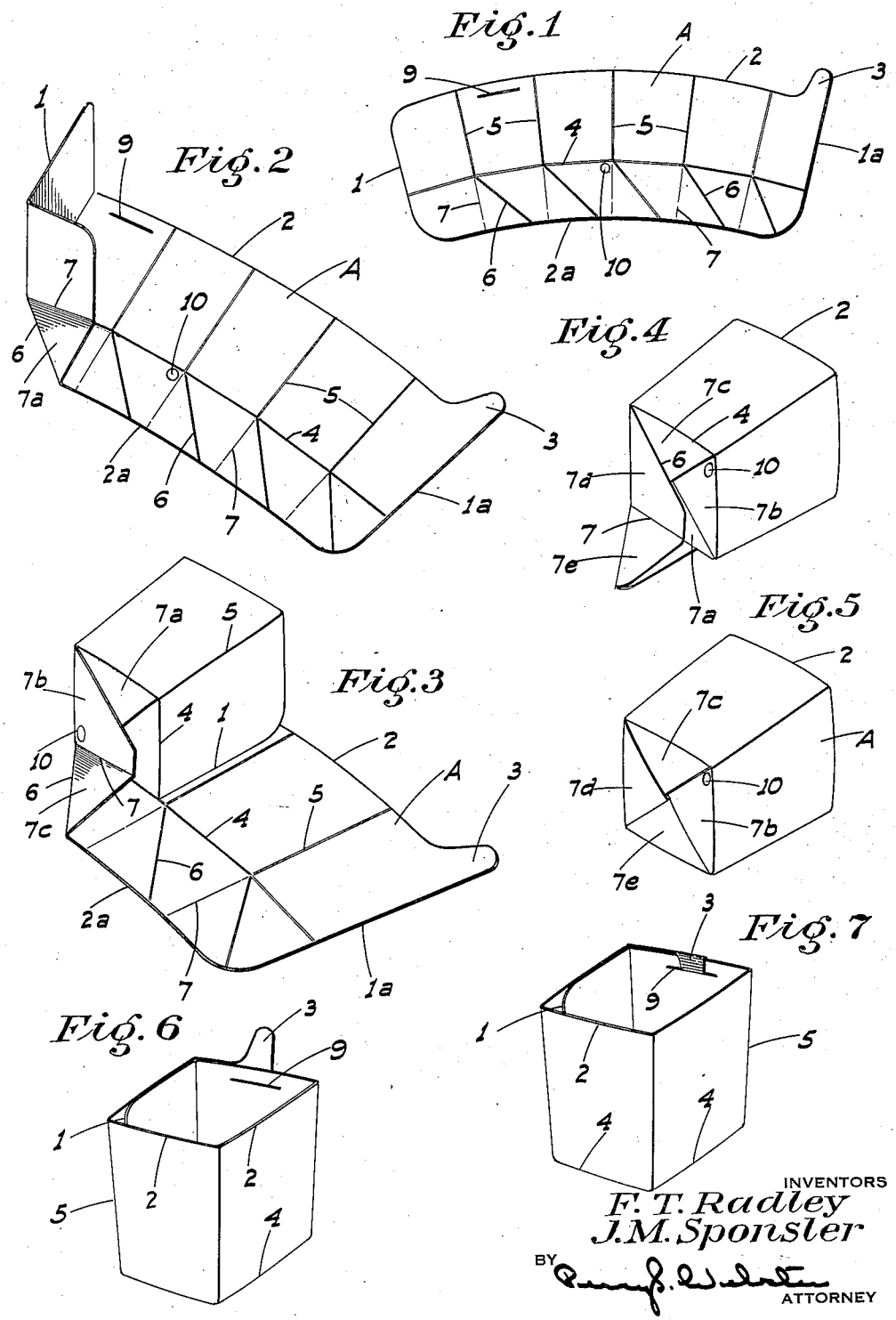
INVENTORS
F. T. Radley
J. M. Sponsler
BY
ATTORNEY April 23, 1935.   F. T. RADLEY ET AL   1,998,637
FLOWERPOT AND BLANK FOR MAKING SAME
Filed Oct. 9, 1933   2 Sheets-Sheet 2

INVENTORS
F. T. Radley
J. M. Sponsler
BY
ATTORNEY

Patented Apr. 23, 1935

1,998,637

UNITED STATES PATENT OFFICE 1,998,637

FLOWERPOT AND BLANK FOR MAKING SAME

Fred T. Radley, Ceres, and Jacob M. Sponsler, Visalia, Calif.

Application October 9, 1933, Serial No. 692,800

1 Claim. (Cl. 229—37)

This invention relates to improvements in the art of making containers for plants as used in nurseries. The main object of the invention is to produce a cheap but efficient pot for setting the plants out either for growth or for transportation and there is a particular demand for something of the character in connection with the sale of potted plants in seed stores, chain stores and like places where these plants are sold in quantities.

The primary object of the invention is to produce a pot of the character described which can be made from waterproof paper and initially cut out in blank form, which blanks may be produced very cheaply and shipped flat to the consumer and by him folded into a strong easily handled pot as desired.

A further object of the invention is to produce the pot in such form and shape as will have the requisite strength to hold the weight of the dirt carried thereby, will hold the moisture of the earth, and also one which will readily stand without falling over when segregated and allowed to stand alone.

A further object is to construct the pot of straight sides so that although made of relatively light material, they may be positioned side by side in a flat or box and readily stand one against the other without collapsing. We aim also to provide the pot with either straight sides or sides with a slight taper, the latter being preferably used where it is desired that aeration may be had around the pots when they are placed closely together in the flat or box.

A further object of the invention is to produce a simple and inexpensive device and yet one which will be exceedingly effective for the purpose for which it is designed.

These objects we accomplish by means of such structure and relative arrangement of parts as will fully appear by a perusal of the following specification and claim.

In the drawings similar characters of reference indicate corresponding parts in the several views:

Figure 1 is a plan view of the preferred form of blank used by us in the formulation of our improved paper pot.

Figure 2 is a perspective view showing the initial folding movement given the blank as the same is started to be formulated into the pot.

Figure 3 is a further perspective view showing the condition of the blank after three folds have been made.

Figure 4 is a perspective view of the pot after all the folds for forming the sides have been made and before the final fold is made to form the bottom.

Figure 5 is a perspective view showing the pot as finally folded, the view particularly showing the manner of folding and interlocking the bottom of the pot.

Figure 6 is a perspective view of the finished pot before the sides have been locked together.

Figure 7 is a similar view after the sides have been locked together.

Figure 8:
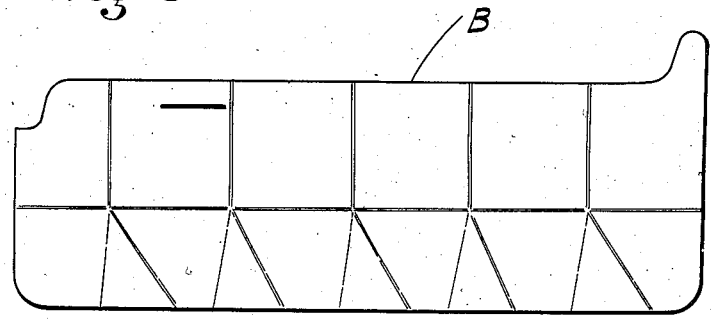
Figure 8 is a plan view of a modified form of blank from that shown in Figure 1.

Referring now more particularly to the characters of reference on the drawings, we will first describe the structure for and method of forming a pot which has a slight taper in its final form.

The structure of such a pot is preferably made initially in the form of a flat blank A. This blank may comprise any suitable semi-flexible waterproof material, preferably a fairly stiff grade of tar paper.

The blank A is in the form of an elongated strip of such length and dimensions that when folded in the manner hereinafter described it will form a pot of the desired size which may vary according to the uses to which the pot is to be put.

We will now particularly describe the structure of the blank A, the method of folding the same, and the pot resulting from such folding thereof.

The end edges 1 and 1a of the blank are cut at relatively diverging angles radial of a common center, the degree of the angle determining the taper of the final pot structure, as will be obvious from the following disclosures.

The side edges 2 and 2a of the blank are curved concentrically of the common center of the side edges 1 so that chords may be properly provided to form the top and bottom edges of the finished tapered pot.

Projecting upwardly from one end and edge of the blank A is a locking tongue 3 which functions to lock the final folds of the pot together as will presently appear.

In preparing the blank to make it useful to formulate the pot a score line 4 is disposed intermediate the side edges 2 and 2a and concentric therewith. This score line determines the bottom edge of the pot, and its distance from the edge 2 determines the height of the pot.

Score lines 5 are disposed at substantially right angles of the score line 4 and between the line 4 and edge 2, and these score lines 5 determine the corner edges of the finished pot. The scoring in this instance is made from that side of the blank which will be on the inside of the finished pot.

On the same side of the blank A as that on which the score lines 5 are made but between the score line 4 and the edge 2a are score lines 6 radiating at an acute angle from the lines 5 in the direction of the end 1a. On the opposite side of the blank and between the line 4 and edge 2a are disposed score lines 7 in direct longitudinal alinement with the lines 5.

The several score lines described function to permit the ready folding of the blank into the finished pot in a manner as will now be described in detail, as follows:

The maker starts at the end 1 of the blank A and bends the blank along the lines 5 (see Figure 2) to form the sides of the pot. As each bend is made at one line 5 the maker presses the adjacent line 7 inwardly to lie parallel with the line 4. This forces a triangular fold to be made as the blank is bent along each line 5 to form the sides of the pot. These triangular folds, numbered 7a to 7e respectively in the drawings, progressively fold upon each other as the forming of the sides is proceeded with (see Figures 2 to 5), and there is thus formed a strong multi-ply bottom for the pot.

There are five score lines 5 so that there will be five of these triangular bottom folds. The first, 7a, will be folded in behind the second, 7b; the second behind the third, 7c; and the third behind the fourth, 7d. The free edge of the fourth fold 7d will then extend parallel with the free edge of the second fold 7b as at 8 in Figure 4, leaving a free space between the two edges, all the other proceeding folds then being folded successively behind each other in interlocked relation. The fifth triangular fold 7e will then be folded over the fourth fold 7d and tucked under the free exposed edge of the second fold 7b. This then will enclose all the folds in interlocked relation one behind the other and form a strong tight bottom for the pot quite capable of well sustaining the weight of material to be held in the pot.

When the blank has been so manipulated to thus form the sides and bottom of the pot the upstanding tongue 3 (Figure 6) is folded over the adjacent edge of the pot and inserted in a slot 9 (Figure 7). This functions to interlock the sides of the pot against unfolding.

A small disc shaped score 10 is made in the blank at a point in the portion which will make the fold 7b. When folded this fold is the only one which does not have an overlapped fold on it. Therefore if drainage is desired from the pot the user may press the scored disc from the material leaving a resulting orifice through which drainage may be had.

Thus a complete pot with both bottom and side elements locked together is formulated from the blank A. The blanks may thus be cheaply made and shipped flat to the consumer and readily and easily folded to shape the pots.

Figure 9:
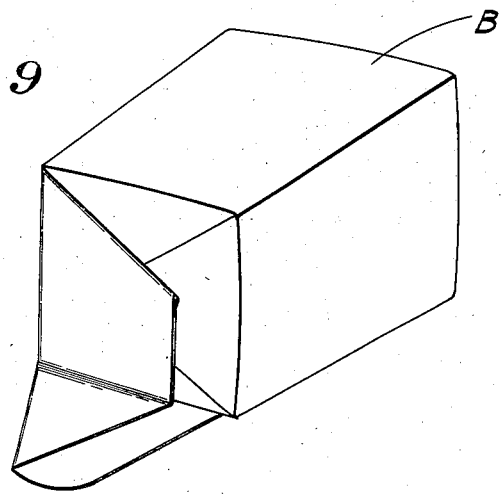
Figure 9 is a perspective view showing the pot formed from the blank of Figure 8 but before the bottom folds have been locked together.
Figure 10:
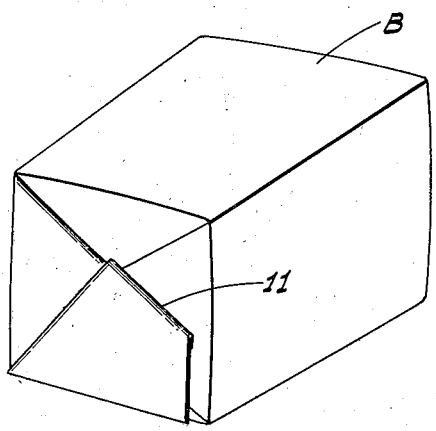
Figure 10 is a similar view after the bottom folds have been locked together.

In Figures 8, 9, and 10 we have shown a modified form of blank and resulting pot structure used when a vertical sided pot is to be made instead of one having tapered sides. In making this type of pot the blank B of Figure 8 does not have the diverging ends radial to a common center but has parallel ends, and the side edge of the blank as well as all the score lines are formed of square lines rather than angled lines, as shown in the blank A. The folding of the blank is the same as described with the blank A, but due to the square ends and lines the final interlocking of the bottom folds does not bring the free edge of the second fold exposed as in the other instance. Therefore the fifth bottom fold cannot be tucked under the free edge of the second fold as in the other structure but must be tucked behind the fourth fold as shown at 11 in Figure 10.

Other than with this change, the formulating of the pot for square sides is attained by the same operation and structure as described for the other views.

From the foregoing description it will be readily seen that we have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claim.

Having thus described our invention what we claim as new and useful and desire to secure by Letters Patent is:

A pot of the character described having bent and overlapping elements comprising the sides of the pot, the outermost element having a bendable tongue projecting upwardly therefrom at its outer end; the element overlapped by said outermost element having a horizontal slot cut therethrough near the top to receive said tongue when the latter is bent over to project into the pot.

FRED T. RADLEY.
JACOB M. SPONSLER.